(12) United States Patent  
Rinck et al.

(10) Patent No.: US 6,904,993 B1  
(45) Date of Patent: Jun. 14, 2005

(54) HYDROSTATIC DRIVE AND METHOD FOR OPERATING SUCH A HYDROSTATIC DRIVE

(75) Inventors: Stefan Rinck, Weissenhorn (DE); Günter Girschikofsky, Senden (DE)

(73) Assignee: Bosch Rexroth AG, Lohr am Main (DE)

( * ) Notice: Subject to any disclaimer, the term of this patent is extended or adjusted under 35 U.S.C. 154(b) by 56 days.

(21) Appl. No.: 10/130,729

(22) PCT Filed: Nov. 8, 2000

(86) PCT No.: PCT/EP00/11033

§ 371 (c)(1),  
(2), (4) Date: May 20, 2002

(87) PCT Pub. No.: WO01/38119

PCT Pub. Date: May 31, 2001

(30) Foreign Application Priority Data

Nov. 24, 1999 (DE) .......................... 199 56 469

(51) Int. Cl.⁷ ............................................ B60K 17/356
(52) U.S. Cl. ....................... 180/244; 180/197; 180/242; 180/307; 180/308
(58) Field of Search ................................ 180/197, 242, 180/244, 305, 307, 308; 701/41, 42; 477/1, 4

(56) References Cited

U.S. PATENT DOCUMENTS

| | | | | |
|---|---|---|---|---|
| 3,656,570 A | * | 4/1972 | Gortnar et al. ............. | 180/6.48 |
| 3,823,792 A | * | 7/1974 | Dinkloh et al. ............. | 180/14.3 |
| 3,841,423 A | * | 10/1974 | Holtkamp et al. ........... | 180/6.3 |
| 4,185,713 A | * | 1/1980 | Williams et al. ............ | 180/242 |
| 4,402,181 A | * | 9/1983 | Acker et al. ................ | 60/427 |
| 4,519,275 A | * | 5/1985 | Maruyama et al. ............ | 477/1 |
| 4,589,511 A | * | 5/1986 | Leiber ........................ | 180/197 |
| 5,184,466 A | * | 2/1993 | Schniederjan et al. ......... | 60/448 |
| 5,241,479 A | * | 8/1993 | Matsuda et al. .............. | 701/83 |
| 5,249,641 A | * | 10/1993 | Sakata ......................... | 180/197 |
| 5,607,027 A | * | 3/1997 | Puett, Jr. .................... | 180/242 |
| 5,775,453 A | * | 7/1998 | Williams et al. ............ | 180/197 |
| 5,848,664 A | * | 12/1998 | Kaspar ........................ | 180/308 |
| 6,135,231 A | * | 10/2000 | Reed ........................... | 180/308 |
| 6,226,987 B1 | * | 5/2001 | Hayashi et al. ............... | 60/447 |
| 6,648,091 B2 | * | 11/2003 | Tanabe ........................ | 180/197 |

FOREIGN PATENT DOCUMENTS

| | | |
|---|---|---|
| DE | 21 35 279 | 1/1973 |
| DE | 31 37 711 A1 | 8/1982 |
| DE | 34 27 436 C2 | 1/1986 |
| DE | 36 10 174 A1 | 10/1986 |
| DE | 35 43 073 C2 | 6/1987 |
| DE | 43 25 703 A1 | 2/1995 |
| EP | 0 482 524 A1 | 4/1992 |
| EP | 0 646 509 A1 | 4/1995 |
| FR | 2 651 729 | 3/1991 |
| GB | 2 116 657 A | 9/1983 |

\* cited by examiner

Primary Examiner—Lesley D. Morris  
Assistant Examiner—Daniel Yeagley  
(74) Attorney, Agent, or Firm—Scully, Scott, Murphy & Presser

(57) ABSTRACT

A hydrostatic drive (1) with a hydraulic pump (3) and a plurality of hydraulic motors (6–9) that are hydraulically linked with the hydraulic pump (3). One speed sensor (20; 21; 22; 23) each allocated to a respective hydraulic motor (6; 7; 8; 9) and is linked with a control device (24) and detects the speed ($n_1$; $n_2$; $n_3$; $n_4$) of the allocated hydraulic motor (6; 7; 8; 9). Every hydraulic motor (6; 7; 8; 9) is functionally linked with a brake device (26; 27; 28; 29) that in turn is linked with the control device (24). When the speed ($n_1$; $n_2$; $n_3$; $n_4$) of one of the hydraulic motors (6; 7; 8; 9) exceeds a predetermined threshold value ($n_g$), the control device (24) triggers the brake device (26; 27; 28; 29) allocated to the associated hydraulic motor (6; 7; 8; 9).

5 Claims, 2 Drawing Sheets

HYDROSTATIC DRIVE AND METHOD FOR OPERATING SUCH A HYDROSTATIC DRIVE

BACKGROUND OF THE INVENTION

1. Field of the Invention

The invention relates to a hydrostatic drive with a hydraulic pump and a plurality of hydraulic motors that are hydraulically linked with said hydraulic pump as well as a method for operating such a hydrostatic drive.

2. Discussion of the Prior Art

A hydrostatic drive according to the present state of the technology is known from DE 35 43 073 C2. In the case of the hydrostatic drive described in this patent an adjustable hydraulic pump is driven by a combustion engine. In a functional circuit a plurality of hydraulic motors is arranged parallel to each other, which each drive different vehicle wheels. The hydraulic motors are likewise designed to be adjustable. One speed sensor which is linked with an electronic control device is allocated to each hydraulic motor or each vehicle wheel. The pivot angle of the hydraulic motors is set synchronously for all hydraulic motors.

If slipping occurs on one of the vehicle wheels owing to reduced surface grip the problem arises that this vehicle wheel spins and the speed of the allocated hydraulic motor increases considerably in comparison to the speed of the other hydraulic motors. As a result a considerable volume flow passes through that hydraulic motor, the vehicle wheel of which is subjected to slipping, as a result of which the volume flow available to the other hydraulic motors, via which the drive operates, is reduced. As a result the efficiency of the hydrostatic drive is substantially lower.

In order to prevent this, it is proposed in DE 35 43 073 C2 to continually compare the speeds of the individual vehicle wheels or hydraulic motors with each other in the electronic control device. If considerable deviation in the speed of one of the vehicle wheels in comparison to the speed of the other vehicle wheels occurs, then this indicates slipping on this vehicle wheel. The hydraulic pivot angle control of the vehicle wheel concerned is overridden by an electromagnetically-operated control valve so that the intake volume of the hydraulic motor allocated to the vehicle wheel concerned is reduced by pivoting back the hydraulic motor.

A disadvantage when that hydraulic motor, the vehicle wheel of which is subjected to slipping, pivots back as proposed in DE 35 43 073 C2 is however that as a result of the hydraulic motor pivoting back, although the volume flow passing through this hydraulic motor is reduced and therefore is available to the other hydraulic motors, at the same time acceleration of the associated vehicle wheel can be linked with the pivoting back of the hydraulic motor, while the pivot angle of the hydraulic pump and of the other hydraulic motors remains constant and therefore a further rise in the speed, particularly, if the rotation of the vehicle wheel is not subject to any friction related to surface grip. This measure therefore does not exclude the risk of the pivoted back hydraulic motor overspeeding.

From DE-AS 21 35 279 a hydrostatic drive with a variable hydraulic pump and a single variable hydraulic motor in combination with a vehicle brake is known as such. The vehicle brake can be pneumatically operated by means of a brake pedal. The pneumatic brake valve is linked with the hydraulic control device so that the hydrostatic gears change down when the vehicle brake is applied, in order to prevent a counter-force arising between the drive via the hydrostatic gears and the vehicle brake. In addition a speed sensor, which triggers the vehicle brake when the speed of the combustion engine reaches its permitted maximum, is arranged on the shaft of the combustion engine connecting with the hydraulic pump. As a result of braking the vehicle the maximum speed is prevented from being exceeded and therefore overspeeding of the combustion engine is avoided. This patent however gives no indication of using the vehicle brake in conjunction with anti-slip regulation on a hydrostatic drive.

SUMMARY OF THE INVENTION

The invention is based on providing a hydrostatic drive, in which a reduction in efficiency is prevented if slipping occurs on one of the drive transmissions allocated to the various hydraulic motors without there being any risk of the hydraulic motors overspeeding and detailing a method for operating the hydrostatic drive according to the invention.

The invention is based on the theory that by arranging a brake device on each hydraulic motor effective limitation in the speed of the hydraulic motors can be achieved, whenever the drive transmission allocated to the particular hydraulic motor is subjected to slipping. A control device selectively operates the brake device of only that hydraulic motor, the drive transmission of which is subjected to slipping. The brake devices of the other hydraulic motors do not operate, so. that their drive transmissions are not affected. In contrast to the pivoting back of the hydraulic motors to a lower intake volume known from the state of the art, the use of brake devices has the advantage that there is no risk of an increase in the speed linked with pivoting back the hydraulic motor. Because the hydraulic motor concerned is braked in a controlled manner overspeeding of this hydraulic motor is reliably prevented.

It is an advantage to design the control device as an electronic control device and to trigger the brake device hydraulically via an electronically-operated control valve. As a result of the electronic control device a quick response time is possible. The control device advantageously can be linked to a further speed sensor to detect the speed of the hydraulic pump, a speed sensor to calculate the road speed of a vehicle propelled by the drive and/or a steering angle transmitter to detect the steering angle of a vehicle propelled by the drive. These additional sensors serve to calculate the variable threshold value for the speeds of the individual hydraulic motors.

The threshold value for the speeds of the hydraulic motors in the simplest case can be determined by arithmetical calculation of the speeds of. all the hydraulic motors. The threshold value can for example be calculated from the arithmetical average of the speeds of all the hydraulic motors. Alternatively or in addition the threshold value can also be determined on the basis of the detected road speed of the driven vehicle. A further additional or alternative possibility of determining the threshold value consists in comparing the volume flow produced by the hydraulic pump with the volume flow through the particular hydraulic motor. If for example four hydraulic motors are provided in the hydrostatic drive and if the volume flow through one of the hydraulic motors is considerably more than a fourth volume flow produced by the hydraulic pump, this would indicate slipping on the corresponding drive transmission.

Whenever at least one of the brake devices is operated it is advantageous if the pivot angle of the hydraulic pump is pivoted back in order to reduce the drive power and/or the pivot angle of the hydraulic motor allocated to the operated brake device is pivoted back, in order to reduce the drive torque of this hydraulic motor. As a result overheating and excessive wear of the operated brake device are prevented.

In addition it is advantageous if the steering angle of the vehicle propelled by the drive is detected via a steering angle transmitter and if the speed difference resulting from the differential effect of two hydraulic motors for example lying opposite each other on a common vehicle axle is taken into consideration when determining the threshold value for triggering the brake device.

BRIEF DESCRIPTION OF THE DRAWING

The invention is described below in more detail with reference to the drawings in which FIG. 1 of the drawings shows one embodiment of a hydrostatic drive according to the invention.

DETAILED DESCRIPTION OF THE INVENTION

Figure 1:
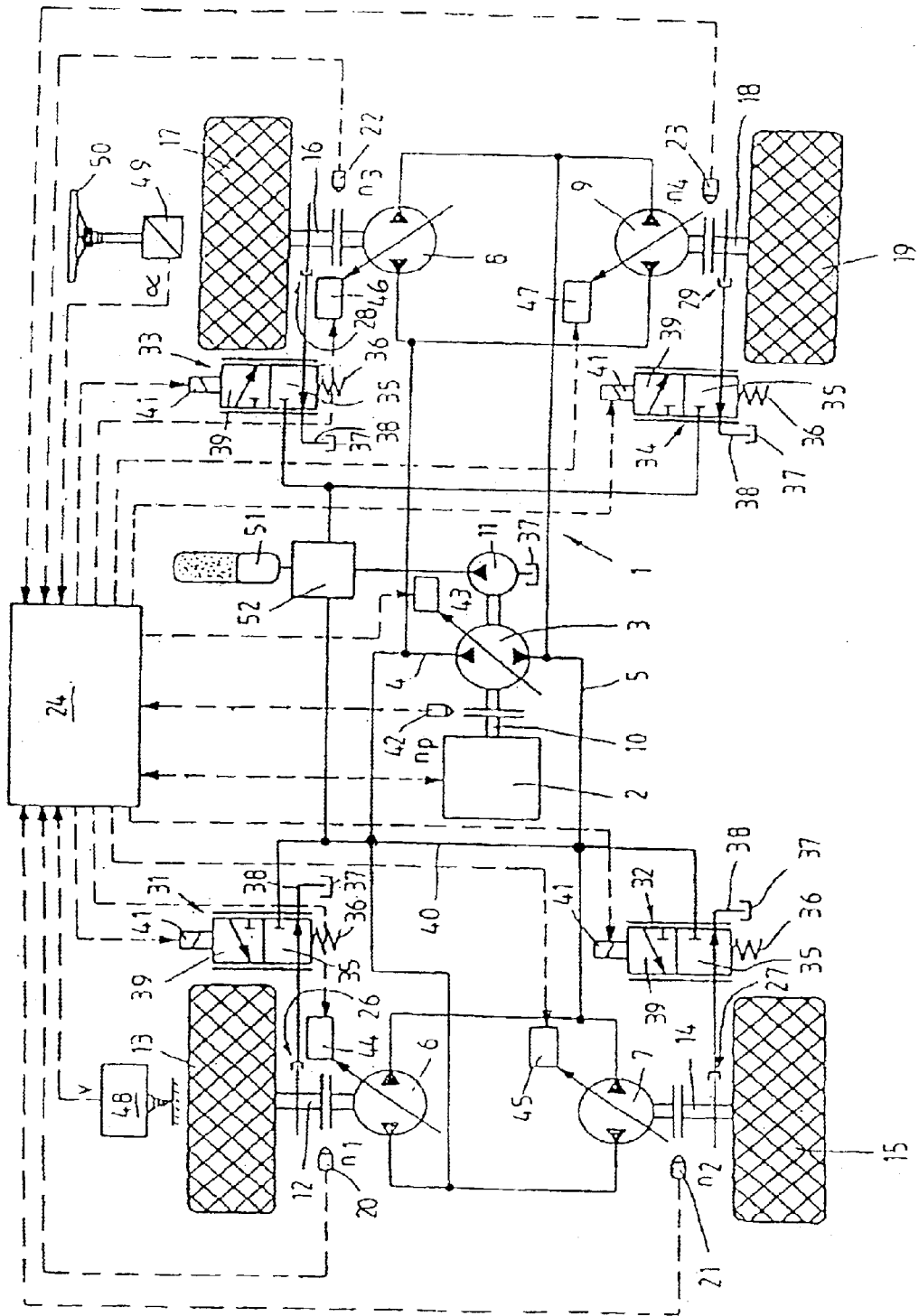

The hydrostatic drive generally designated with the reference 1 comprises a hydraulic pump 3 driven by a combustion engine 2, which is hydraulically linked via a functional circuit consisting of a first working line 4 and a second working line 5 with at least two hydraulic motors, in the embodiment with four hydraulic motors, namely the first hydraulic motor 6, the second hydraulic motor 7, the third hydraulic motor 8 and the fourth hydraulic motor 9. The hydraulic pump 3 is connected via ad rive shaft 10 to the combustion engine 2. In addition an auxiliary pump 11 sits on the drive shaft 10 in the illustrated embodiment. The hydraulic motors 6–9 are arranged parallel to each other in the functional circuit 4, 5, one of the connections of the hydraulic motors 6–9 each being linked via the first working line 4 with a connection of the hydraulic pump 3 and the other connection of the hydraulic motors 6 to 9 each is linked via the second working line 5 with the other connection of the hydraulic pump 3.

The first hydraulic motor 6 drives a first vehicle wheel 13 via a first driven shaft 12, the second hydraulic motor 7 drives a second vehicle wheel 15 via a second driven shaft 14, the third hydraulic motor 8 drives a third vehicle wheel 17 via a third driven shaft 16 and the fourth hydraulic motor 9 drives a fourth vehicle wheel 19 via a fourth driven shaft 18. The speed $n_1$ of the first hydraulic motor 6 is detected by a first speed sensor 20, the speed $n_2$ of the second hydraulic motor 7 by a second speed sensor 21, the speed $n_3$ of the third hydraulic motor 8 by a third speed sensor 22 and the speed $n_4$ of the fourth hydraulic motor 9 by a fourth speed sensor 23. The electrical speed signals in the embodiment of the speed sensors 20–23 are fed to an electronic control device 24 in the embodiment, which can for example be designed as a microcontroller or microprocessor.

According to the invention a brake device 26–29 is allocated to each respective hydraulic motor 6–9, that is to say a first brake device 26 is allocated to the first hydraulic motor 6, a second brake device 27 to the second hydraulic motor 7, a third brake device 28 to the third hydraulic motor 8 and a fourth brake device 29 to the fourth hydraulic motor 9, which when operated brakes the corresponding driven shaft 12, 14, 16 or 18. In the preferred embodiment shown the brake devices 26–29 can each be operated hydraulically and in each case triggered via a control valve 31, 32, 33 or 34. The control valves 31 to 34 are each designed as 3/2-way valves. In a first valve position 35 the brake devices 26–29 are each linked with a tank line 38 leading to the hydraulic fluid tank 37. In a second valve position 39 on the other hand the brake devices 26–29 are linked with a pressure line 40 so that the allocated brake device 26, 27, 28 or 29 in this valve position is under pressure and therefore a brake action is exerted on the allocated driven shaft 12, 14, 16 or 18. The control valves 31–34 can each be operated by an electrically-operated actuator 41, for example an electro magnet. The control valves 31–34 are preferably designed as proportional valves, that is to say the control valves 31–34 can assume any intermediate position in proportion to the energising electrical current between the valve positions 35 and 39. A reset spring 36 forces the control valves 31–34 each to assume the first valve position 35 as basic position if they are not triggered by the actuator 41. The electrically-operated actuators 41 of the control valves 31–34 communicate with the electronic control device 24 and can be triggered by this electrically.

In the embodiment shown a fifth speed sensor 42 is also provided on the drive shaft 10 to detect the speed $n_p$ of the hydraulic pump 3. The hydraulic pump 3 and the hydraulic motors 6–9 in the preferred embodiment can be pivoted, that is to say the pumped volume per revolution of the hydraulic pump 3 and the intake volume per revolution of the hydraulic motors 6–9 can be altered. A regulating device 43 of the hydraulic pump 3 as well as a regulating device 44 of the first hydraulic motor 6, a regulating device 45 of the second hydraulic motor 7, a regulating. device 46 of the third hydraulic motor 8 and a regulating device 47 of the fourth hydraulic motor 9 can be triggered by the electronic control device 24.

The electronic control device 24 is preferably also linked with a speed sensor 48, which detects over ground the road speed v of the vehicle propelled by the hydrostatic drive 1, as well as linked with a steering angle transmitter 49, which detects the steering angle α for example predetermined by a steering wheel 50 of the vehicle propelled by the drive 1.

The pressure line 40 is supplied with hydraulic fluid from a hydraulic fluid reservoir 51, which the auxiliary pump 11 draws from the hydraulic fluid tank 37. The hydraulic fluid reservoir 51 is filled through a reservoir filling valve 52.

Figure 2:
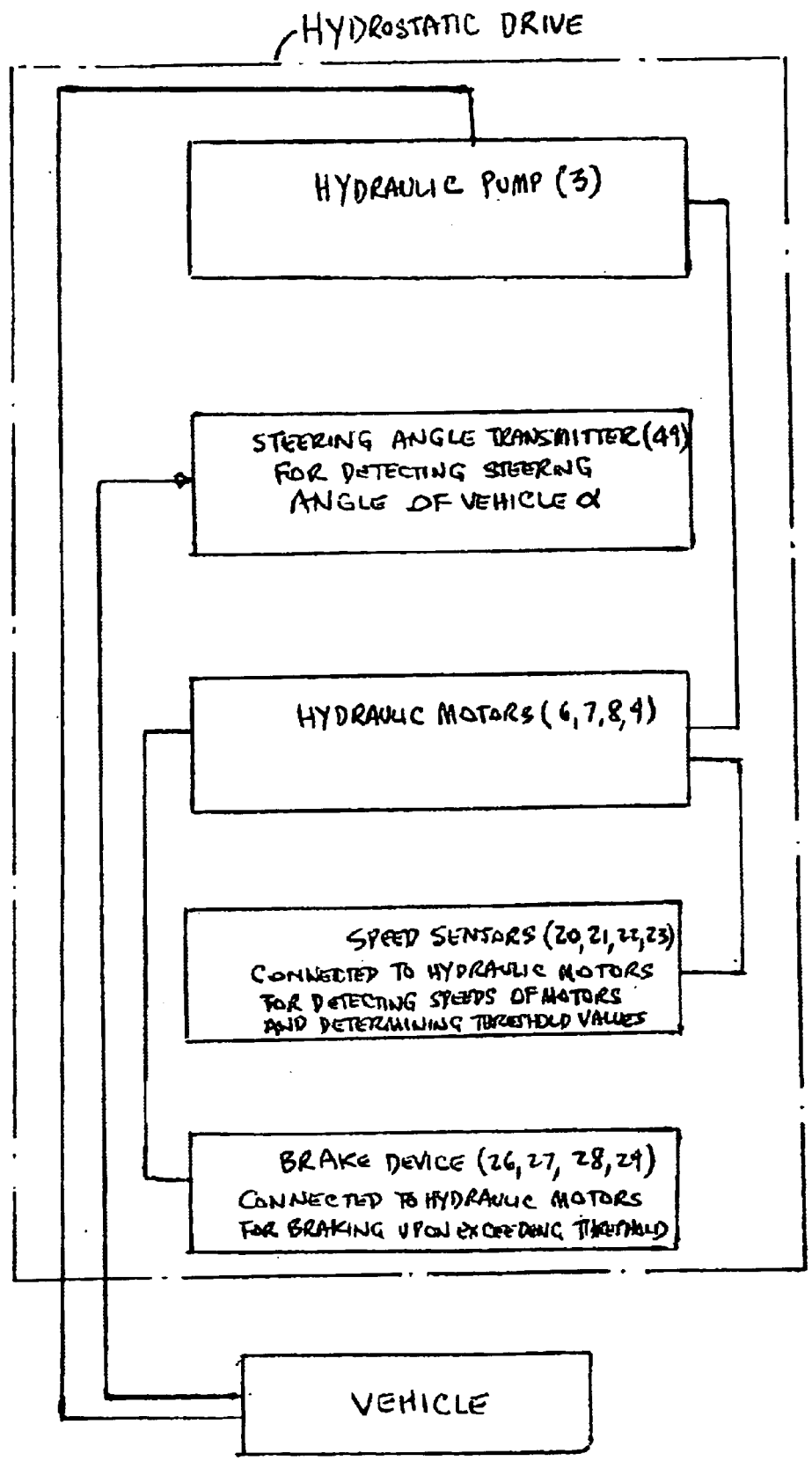
FIG. 2 illustrates a flowchart of the method of operation of the hydrostatic drive.

The mode of operation of drive 1 according to the invention as shown in the flowchart of FIG. 2 is as follows:

Provided no slipping occurs at all on the drive wheels 13, 15, 17 and 19 and there is good surface grip the drive functions as all-wheel drive via all the hydraulic motors 6–9. The pivot angle of the hydraulic motors 6–9 in this case is set synchronously by the electronic control device 24, apart from via corrections carried out by the differential when rounding bends. With increasing vehicle road speed in this case the angle of the hydraulic pump 3 is pivoted further out and then the angle of the hydraulic motors 6–9 is pivoted back with further increasing vehicle road speed.

If however slipping occurs on one of the vehicle wheels 13, 15, 17, 19, for example on the vehicle wheel 13, this would have led, without the measure according to the invention, to the speed $n_1$ on the vehicle wheel 13 drastically increasing owing to the reduced surface grip and therefore the volume flow passing through the hydraulic motor 6 increasing. With constant flow produced by the hydraulic pump 3. it follows that the volume flow for the other hydraulic motors 7, 8 and 9 still available for the drive would drastically decrease and therefore the efficiency of the hydrostatic drive 1 would reduce.

According to the invention however the brake device 26 of the hydraulic motor 6, the vehicle wheel 13 of which is subjected to slipping, is operated so that the speed $n_1$ of the hydraulic motor 6 is restricted. The braking action is ideally proportioned so that on low-grip surfaces the vehicle wheel 13 can rotate without affecting road-holding. The speed $n_1$ of the hydraulic motor 6 is then not differentiated from the speeds $n_2$, $n_3$, $n_4$ of the other hydraulic motors 7–9 so that the volume flow through the other hydraulic motors 7–9 remains unaffected by the slip on the vehicle wheel 13. In addition the hydraulic motor 6 can be pivoted back via the regulating device 44 to a lesser intake volume per revolution so that the volume flow through the hydraulic motor 6 reduces or even falls to zero and therefore the volume flow produced by the hydraulic pump 3 is almost totally available for the drive via the hydraulic motors 7, 8 and 9.

In order to prevent overheating or excessive wear of the brake devices 26–29, it is advantageous to reduce the drive power of the hydrostatic drive 1 whenever at least one of the brake devices 26–29 is operated. This can be carried out either directly by reducing the fuel fed to the combustion engine 2 and/or restricting the air intake or by pivoting back the hydraulic pump 3 by means of the regulating device 43.

To establish whether slipping occurs on one of the vehicle wheels 13, 15, 17 or 19, several possibilities are available which can also be used in combination and are described below.

According to the invention the speeds $n_1$, $n_2$, $n_3$ and $n_4$ of all the vehicle wheels 13, 15, 17 and 19 are continually measured by the speed sensors 20, 21, 22 and 23. The measurement signal is fed to the electronic control device 24. By comparing the speeds $n_1$, $n_2$, $n_3$ and $n_4$ it can be established whether one of the speeds $n_1$, $n_2$, $n_3$ and $n_4$ is considerably greater than the speeds of the other vehicle wheels 13, 15, 17, 19. For example a threshold value $n_g$ for the speeds can be determined by calculating the arithmetical average of all the speeds $n_1$, $n_2$, $n_3$ and $n_4$ and for this purpose a tolerance-constant C is added. The threshold value $n_g$ then results in the embodiment as follows:

$$n_g=(n_1+n_2+n_3+n_4)/4+C \quad (1)$$

If one of the speeds $n_1$, $n_2$, $n_3$ and $n_4$ exceeds this threshold value $n_g$, this indicates slipping on the vehicle wheel 13, 15, 17 or 19 concerned so that the corresponding brake device 26, 27, 28 or 29 is operated. If the speed of the vehicle wheel concerned by the slipping again falls below the threshold value ng, the corresponding brake device 26, 27, 28 or 29 is again released.

An alternative or additional possibility of determining the threshold value ng for the speeds $n_1$, $n_2$, $n_3$ and $n_4$ exists in determining over ground the road speed v of the vehicle propelled by the hydrostatic drive 1 by means of the speed sensor 48. The threshold value $n_g$ is then arrived at by dividing the road speed v by the circumference U of the particular vehicle wheel 13, 15, 17 or 19 and adding the tolerance-constant C, that is to say using the formula:

$$n_g=v/U+C \quad (2)$$

A further alternative or additional possibility of determining the threshold value $n_g$ is to compare the volume flow produced by the hydraulic pump 3 with the volume flow passing through the hydraulic motors 6–9. Provided the hydraulic motors 6 to 9 are pivoted synchronously, the following equation applies when no slip occurs to the four hydraulic motors in the embodiment:

$$n_p \cdot V_p = 4 \cdot n_m \cdot V_m$$

where $n_p$ is the speed of the hydraulic pump 3 detected with the speed sensor 42, $V_p$ is the pumped volume produced by the hydraulic pump 3 per revolution, $n_m$ the target speed without slip of the hydraulic motors 6–9 and $V_m$ the intake volume of the hydraulic motors 6–9 per revolution. The pumped volume per revolution of the hydraulic pump 3 is established by the regulating device 43, while the intake volume per revolution of the hydraulic motors 6–9 is determined by the synchronously triggered regulating devices 44–47. Therefore the following is true for the threshold value $n_g$ of the speed of the hydraulic motors 6–9, which leads to operation of the allocated brake device 26–29, $$n_g=(n_p \cdot V_p)/(4 \cdot V_m)+C \quad (3)$$

In this case C again signifies a tolerance-constant, which makes it possible for the measured actual speed $n_1$, $n_2$, $n_3$ and $n_4$ to slightly exceed the target speed $n_m$ calculated as above.

Since when rounding bends a drift in the speeds $n_1$, $n_2$, $n_3$ and $n_4$ of the vehicle wheels 13 and 15 or 17 and 19 lying opposite each other on one axle results due to the differential effect, it is advantageous to measure the tolerance constant C as a function of the steering angle α. The steering angle a of the vehicle can be detected by the steering angle transmitter 49. The tolerance-constant C associated with the detected steering angle α can be stored in a memory of the electronic control device 24 in the form of a table and called up accordingly.

If the threshold value $n_g$ for the speeds is determined using several methods, an average can for example be obtained from the threshold values ng calculated with the various methods or the minimum threshold value $n_g$ can be used in each case to operate the brake devices 26–29.

The invention is not limited to the embodiment shown. For example the drive can also function via fewer or more than four vehicle wheels. Instead of vehicle wheels the drive can also function via drive chains. The drive can also function via a plurality of hydraulic pumps, whereby at least two hydraulic motors are allocated to each hydraulic pump. As a brake device either a separate brake can be fitted for each hydraulic motor 6 or an existing vehicle brake can be modified so that the vehicle brake can be operated separately and independently for each vehicle wheel. The pressure in the pressure line 40 to operate the brake devices 26–29 can also be obtained from the working pressure in the working lines 4 and 5. For this purpose the pressure line 40 can be connected via a pressure reduction valve and a shuttle valve with the working line 4 or 5 in each case supplying pressure. The drive 1 according to the invention can also be used, in particular for agricultural machines, as a steering brake device.

What is claimed is:

1. A method for operating a hydrostatic drive (1), which includes at least one hydraulic pump (3); a steering angle transmitter (49) for detecting a steering angle (α) of a vehicle driven by the drive (1) and a plurality of hydraulic motors (6–9) hydraulically connected with the hydraulic pump (3), wherein one speed sensor of a plurality of sensors (20; 21; 22; 23) and one brake device (26; 27; 28; 29) are each operatively connected to a respective hydraulic motor of a plurality of motors (6; 7; 8; 9), said method comprising the steps of:

detecting the speeds ($n_1$; $n_2$; $n_3$; $n_4$) of collectively said hydraulic motors (6–9) with speed sensors (20–23) associated with each of the hydraulic motors (6–9), and the steering angle (α) of a vehicle propelled by the drive (1), determining whether one of the speeds ($n_1$; $n_2$; $n_3$; $n_4$) of the hydraulic motors (6–9) exceeds a predetermined threshold value ($n_g$), wherein a speed difference of the hydraulic motors (6–9) resulting from cornering of the vehicle is taken into consideration dependent on the detected steering angle ($\alpha$), and braking the hydraulic motor (6; 7; 8; 9) of which the speed ($n_1$; $n_2$; $n_3$; $n_4$) exceeds the predetermined threshold value ($n_g$) through operation of the brake device (26; 27; 28; 29) which is operatively associated with said hydraulic motor (6; 7; 8; 9).

2. The method according to claim 1, wherein the brake device (26; 27; 28; 29) is released upon the speed ($n_1$; $n_2$; $n_3$; $n_4$) of the therewith associated hydraulic motor (6; 7; 8; 9) falls below the predetermined threshold value ($n_g$).

3. The method according to claim 2, wherein the threshold value ($n_g$) is determined by an arithmetical calculation based on the speeds ($n_1$; $n_2$; $n_3$; $n_4$) of the collective hydraulic motors (6–9).

4. The method according to claim 3, wherein the threshold value is the arithmetical average of the speeds ($n_1$; $n_2$; $n_3$; $n_4$) of collectively said hydraulic motors (6–9) plus a tolerance constant (C).

5. The method according to claim 2, wherein the drive (1) comprises a further speed sensor (48) for detecting the road speed (v) of a vehicle driven by the drive (1) wherein the threshold value ($n_g$) is determined on the basis of the detected vehicle road speed (v).

* * * * *